United States Patent
Takemura et al.

(10) Patent No.: US 6,878,753 B1
(45) Date of Patent: Apr. 12, 2005

(54) PROCESS FOR PRODUCING POLYURETHANE FOAM

(75) Inventors: Kazunari Takemura, Wakayama (JP); Kenichi Miyamoto, Wakayama (JP); Minoru Sawai, Wakayama (JP); Masahiro Mori, Wakayama (JP)

(73) Assignee: Kao Corporation, Tokyo (JP)

( * ) Notice: Subject to any disclaimer, the term of this patent is extended or adjusted under 35 U.S.C. 154(b) by 217 days.

(21) Appl. No.: 10/049,046

(22) PCT Filed: Aug. 8, 2000

(86) PCT No.: PCT/JP00/05294

§ 371 (c)(1),
(2), (4) Date: Feb. 7, 2002

(87) PCT Pub. No.: WO01/10924

PCT Pub. Date: Feb. 15, 2001

(30) Foreign Application Priority Data

Aug. 9, 1999 (JP) .......................................... 11-225676

(51) Int. Cl.$^7$ .............................................. C08G 18/42
(52) U.S. Cl. ...................... 521/128; 521/130; 521/163; 521/172; 521/173
(58) Field of Search ................................ 521/128, 130, 521/163, 172, 173

(56) References Cited

U.S. PATENT DOCUMENTS

| | | |
|---|---|---|
| 4,548,998 A | 10/1985 | Chang et al. |
| 4,644,017 A | 2/1987 | Haas et al. |
| 5,118,721 A * | 6/1992 | Godoy et al. ............... 521/103 |
| 5,416,130 A | 5/1995 | Liman et al. |
| 6,107,355 A * | 8/2000 | Horn et al. ................... 521/51 |

FOREIGN PATENT DOCUMENTS

| | | |
|---|---|---|
| DE | 19629161 A1 | 1/1998 |
| EP | 877942 A1 | 11/1998 |
| EP | 0 930 324 A1 | 7/1999 |
| JP | 52-92300 | 8/1977 |
| JP | 52-92300 A | 8/1977 |
| JP | 61-85431 | 5/1986 |
| JP | 61-85431 A | 5/1986 |
| JP | 61-268716 | 11/1986 |
| JP | 2-261818 | 10/1990 |
| JP | 2-261818 A | 10/1990 |
| JP | 6-322063 | 11/1994 |
| JP | 6-322063 A | 11/1994 |
| JP | 11-263821 A | 9/1999 |
| JP | 11-263821 | 9/1999 |
| WO | WO 96/01428 | 1/1996 |

OTHER PUBLICATIONS

EP877942 Absract; M.F. Sanders; Nov. 11, 1998.

* cited by examiner

Primary Examiner—John M. Cooney, Jr.
(74) Attorney, Agent, or Firm—Birch, Stewart, Kolasch & Birch, LLP

(57) ABSTRACT

A process for producing a polyurethane foam which comprises mixing a polyol solution comprising 100 parts by weight of a polyester-polyol, 0.1 to 1.8 parts by weight of water and 0.1 to 5 parts by weight of urea, and a catalyst with a polyisocyanate compound and foaming the mixture. According to the process, there can be produced a polyurethane foam which satisfies both productivity and moldability even when having a low density, and is suitable for use in shoe soles.

9 Claims, No Drawings

PROCESS FOR PRODUCING POLYURETHANE FOAM

This application is the national phase under 35 U.S.C. § 371 of PCT International Application No. PCT/JP00/05294 which has an International filing date of Aug. 8, 2000, which designated the United States of America.

TECHNICAL FIELD

The present invention relates to a process for producing a polyurethane foam. More specifically, the present invention relates to a process for producing a polyurethane foam is suitable for use in shoe soles and the like.

BACKGROUND ART

When a density of a shoe sole made of a polyurethane foam is lowered in order to reduce its costs and weight, its mechanical strength is lowered. Therefore, in order to improve the mechanical strength of the polyurethane foam, there has been employed the addition of a cross-lining agent, a polyfunctional polyol, an aromatic polyol or the like. Also, since the strength at the initial of reaction is lowered along with lowering of the density, the time period required for demolding a molded article such as a sole from a mold (hereinafter referred to as "demolding time") becomes long. As its countermeasure, the amount of a catalyst has been generally increased.

Another problem caused by the reduction of weight is that voids (air-accumulation generated in the internal of the molded article) or air-lack (surface defects caused by insufficient filling of a liquid molding material and/or a foamed article in a complicated internal shape of a mold) is generated, so that insufficient filling is apt to cause molding failure. In many cases, these are caused by the insufficient filling of a liquid molding material into a mold due to its small amount injected. This problem becomes notable especially when a midsole having a complicated shape is produced or when a sole having a density of the molded article of not more than 0.30 g/cm$^3$ is produced.

In order to avoid the molding failure, there has been generally employed a process for suppressing the reactivity at the initial stage by reducing the amount of a catalyst. However, there are some defects in this process such that the productivity is lowered, since the exhibition of the initial strength is delayed, to prolong the demolding time.

Therefore, conventionally, it has been difficult to satisfy both productivity and moldability.

Incidentally, there has been known a process for producing a non-flexible polyurethane foam by using a low-molecular weight polyol together with a high-molecular weight polyol, and simultaneously using not less than 1 part by weight of urea and not less than 2 parts by weight of water per 100 parts by weight of the polyol (Japanese Patent Laid-Open No. Sho 61-268716). However, an object of this process is to increase gas permeability. Therefore, this process does not suggest a process for improving strength and moldability of the polyurethane foam using urea. Moreover, since the polyurethane foam obtained by this process is not flexible but brittle, the polyurethane foam is completely unsuitable for shoe soles.

DISCLOSURE OF INVENTION

An object of the present invention is to provide a process for producing a polyurethane foam which satisfies both productivity and moldability even when having a low density. Especially, an object of the present invention is to favorably provide a process for producing a polyurethane foam for shoe soles.

The gist of the present invention relates to a process for producing a polyurethane foam comprising mixing a polyol solution comprising a polyester-polyol, 0.1 to 1.8 parts by weight of water and 0.1 to 5 parts by weight of urea based on 100 parts by weight of the polyester-polyol, and a catalyst, with a polyisocyanate compound and foaming the mixture.

BEST MODE FOR CARRYING OUT THE INVENTION

Examples of the polyester-polyol include a polyester-polyol prepared by the polycondensation of a polyhydric alcohol such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose or sorbitol, with a dibasic acid such as oxalic acid, malonic acid, succinic acid, adipic acid, sebacic acid, maleic acid, fumaric acid, phthalic acid, terephthalic acid or dimer acid, in which each of the polyhydric alcohol and the dibasic acid is used alone or in combination, a polycaprolactone-polyol, and the like. These polyester-polyols can be used alone or in admixture thereof.

Among these polyester-polyols, a polyester-polyol X which is obtained by polycondensing (a) an acid component comprising at least one phthalic acid component selected from phthalic anhydride, o-phthalic acid and terephthalic acid, and an aliphatic polybasic acid; with (b) a polyhydric alcohol, which is liquid at 40° C. and has a viscosity of not more than 10,000 mPa·s at 60° C. is preferable, from the viewpoint of improving mechanical strength such as initial strength.

In the polyester-polyol X, the molar ratio of the phthalic acid component/aliphatic polybasic acid is preferably 0.05 to 0.5, more preferably 0.05 to 0.3, especially preferably 0.05 to 0.2.

Among the aliphatic polybasic acids, aliphatic dibasic acids such as oxalic acid, malonic acid, succinic acid, adipic acid, sebacic acid, maleic acid and fumaric acid are preferable from the viewpoint of easy availability.

It is preferable that a trifunctional component is contained in the polyhydric alcohol in order to increase the strength of a resulting polyurethane foam to prevent the polyurethane foam from shrinking. Representative examples of the trifunctional component include triols such as trimethylolpropane and glycerol, and these trifunctional components can be used alone or in admixture thereof. It is desired that the molar ratio of the trifunctional component/polyhydric alcohol is 0.01 to 0.3, preferably 0.02 to 0.2, more preferably 0.02 to 0.1, from the viewpoints of increasing the strength of a resulting polyurethane foam to prevent its shrinkage. Also, it is desired that the amount of the trifunctional component is 0.1 to 20 parts by weight, preferably 1 to 15 parts by weight, more preferably 2.5 to 10 parts by weight, based on 100 parts by weight of the polyester-polyol, from the viewpoints of increasing the strength of a resulting polyurethane foam to prevent its shrinkage.

The content of the polyester-polyol X in the above-mentioned polyester-polyol is preferably not less than 5% by weight from the viewpoint of producing a polyurethane foam which is excellent in mechanical strength. Furthermore, it is desired that the content is 5 to 95% by weight, preferably 20 to 90% by weight, more preferably 40 to 90% by weight, in considerations of favorably maintaining liquidity and viscosity of the above-mentioned polyester-polyol.

A polyol solution is obtained by previously mixing a catalyst, water and urea, and a chain extender as occasion demands with the polyester-polyol.

The amount of urea is 0.1 to 5 parts by weight, preferably 0.5 to 2 parts by weight based on 100 parts by weight of the polyester-polyol from the viewpoint of improvement in moldability and strength.

A process for adding urea during the preparation of the polyol solution is not limited to specified ones. For instance, urea may be previously dissolved in water or a chain extender, or directly added to a polyester-polyol.

The polyisocyanate compound includes aromatic, alicyclic or aliphatic polyisocyanates, having not less than two isocyanate groups, mixtures thereof, and modified polyisocyanates obtained by modifying these polyisocyanate compounds. As the concrete examples, there can be cited aromatic polyisocyanates such as tolylene diisocyanate, methylenediphenyl diisocyanate, naphthylene diisocyanate, xylylene diisocyanate and polymethylenepolyphenylene diisocyanate; alicyclic polyisocyanates such as hydrogenated methylenediphenyl diisocyanate, hydrogenated tolylene diisocyanate and isophorone diisocyanate; aliphatic polyisocyanates such as hexamethylene diisocyanate and lysine diisocyanate; mixtures thereof; modified products thereof; and the like. As the modified products, there can be cited, for instance, prepolymer-modified products which are reaction products of the polyisocyanate with the polyol, nurate-modified products, urea-modified products, carbodiimide-modified products, arophanate-modified products, burette-modified products, and the like. Among them, the aromatic polyisocyanates and modified products thereof are preferable.

The mixing ratio of the polyol solution to the polyisocyanate compound can be variously changed. Usually, the weight ratio of the polyol solution/polyisocyanate compound is preferably 0.6 to 1.4, more preferably 0.8 to 1.2, in consideration of mixing efficiency.

As the catalyst, a tertiary amine is preferable from the viewpoints of improvements of moldability and productivity. As the examples thereof, there can be cited 1,4-diazabicyclo[2.2.2]octane, N,N,N',N'-tetramethylhexamethylenediamine, N,N,N',N'-tetramethylpropylenediamine, N,N,N',N',N"-pentamethyldiethylenetriamine, trimethylaminoethylpiperazine, N,N-dimethylcyclohexylamine, N,N-dimethylbenzylamine, N-methylmorpholine, N-ethylmorpholine, triethylamine, tributylamine, bis(dimethylaminoalkyl)piperazines, N,N,N',N'-tetramethylethylenediamine, N,N-diethylbenzylamine, bis(N,N-diethylaminoethyl)adipate, N,N,N',N'-tetramethyl-1,3-butanediamine, N,N diethyl-β-phenylethylamine, 1,2-dimethylimidazole, 2-methylimidazole, and the like. These catalysts can be used alone or in admixture of not less than two kinds.

As a catalyst other than the tertiary amines, there can also be used an organometallic compound such as dibutyltin dilaurate, stannous oleate, cobalt naphthenate or lead naphthenate.

The amount of the catalyst is preferably 0.1 to 4 parts by weight, more preferably 1 to 2 parts by weight based on 100 parts by weight of the polyester-polyol, from the viewpoints of moldability and productivity.

Water is used as a blowing agent. The amount of water is 0.1 to 1.8 parts by weight, preferably 0.3 to 1.6 parts by weight more preferably 0.8 to 1.6 parts by weight based on 100 parts by weight of the polyester-polyol; from the viewpoints of sufficiently lowering the density of a foam and preventing the foam from shrinking or skin-peeling.

A mixture of water with a hydrocarbon, a chlorofluorocarbon, a hydrogenated fluorocarbon or the like can be used. However, it is preferable that water is used alone from the viewpoint of avoiding the problem caused by the depletion of the ozone layer of the earth.

The chain extender includes low-molecular compounds having not less than two active hydrogen atoms in its molecule, for instance, polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol diglycerol, dextrose and sorbitol; aliphatic polyamines such as ethylenediamine and hexamethylenediamine; aromatic polyamines; alkanolamines such as diethanolamine, triethanolamine and diisopropanolamine; and the like. These chain extenders can be used alone or in admixture thereof. Among them, those which are liquid at 20° C. are preferred, and ethylene glycol is especially preferred.

In addition, there can be used a silicone surfactant, a pigment, an antioxidant, a yellowing preventive or the like as an additive.

A process for producing a polyurethane foam includes, for instance, a process comprising mixing a polyol solution, which is previously prepared by mixing a polyol, with a catalyst, water and urea, and a chain extender and an additive as occasion demands with stirring, with a polyisocyanate compound with stirring in a molding machine; and injecting the resulting mixture into a mold and foaming the mixture, and the like. More specifically, there can be employed, for instance, a process comprising mixing the above-mentioned polyol solution with stirring using a tank or the like, controlling the temperature of the polyol solution usually to 40° C. or so, and reacting the polyol solution with the polyisocyanate compound using a foaming machine such as an automatically mixing and injecting foaming machine or an automatically blending and injecting foaming machine and foaming the mixture.

The density of a molded article of the polyurethane foam of the present invention is preferably 0.15 to 0.45 g/cm$^3$, more preferably 0.20 to 0.30 g/cm$^3$, from the viewpoints of maintaining the strength of a foam and reducing its weight.

EXAMPLES

The term "parts" as referred hereinafter means "parts by weight."

Examples 1 to 9 and Comparative Examples 1 to 5

As a polyester-polyol, there were used EDDYFOAM E-601, EDDYFOAM E-605 and EDDYFOAM E-540 (hereinabove trade names) commercially available from Kao Corporation, a polyester-polyol having a number-average molecular weight of 2147, obtained by a conventional esterification reaction of 100 parts of adipic acid, 12.6 parts of terephthalic acid and 51.1 parts of ethylene glycol (hereinafter referred to as "Polyester-Polyol A"), and a polyester-polyol having a number-average molecular weight of 1700, obtained by a conventional esterification reaction of 100 parts of adipic acid, 27.6 parts of phthatic acid and 60.9 parts of ethylene glycol (hereinafter referred to as "Polyester-Polyol B") in a ratio shown in Table 1.

Compounds shown in Table 1 were added to 100 parts by weight of the polyester-polyol in a ratio shown in Table 1, and the resulting mixture was homogenized with a hand mixer commercially available from Hitachi Koki Co., Ltd. under the trade name of UM-15 to give a polyol solution.

There were used EDDYFOAM AS-651-60C (trade name) commercially available from Kao Corporation as a catalyst; EDDYFOAM AS-11S (trade name) commercially available from Kao Corporation as a surfactant; NV-9-953 (trade name) commercially available from Nippon Pigment Co., Ltd. as a pigment; and EDDYFOAM B-3321 (trade name) commercially available from Kao Corporation as a polyisocyanate compound.

A tank of a pouring-type low-pressure blowing machine was charged with the above-mentioned polyol solution, and the liquid temperature was controlled to 40° C. The other tank was charged with the polyisocyanate compound, and the liquid temperature was controlled to 35° C. in the same manner.

The polyol solution and the polyisocyanate compound were mixed with stirring by using the above-mentioned blowing machine (the mixture in this state is hereinafter referred to as "starting materials"), and the starting materials were injected into a mold, and allowed to foam to give a polyurethane foam.

The mixing ratio of the polyol solution to the polyisocyanate compound was determined by evaluating the free-foam state during the foaming reaction.

The isocyanate index represented by the formula: [(amount of isocyanate actually used)/(amount of isocyanate stoichiometrically equivalent to that of polyol)]×100 is shown in Table 1.

The physical properties and moldability of the polyurethane foam were evaluated in accordance with the following methods. The results are shown in Table 1.

A. Physical Properties of Foam
[Density of Molded Article]

A testing mold (a mold of 100 mm×300 mm×10 mm for determination of physical properties, material: iron) was provided, and the temperature of the testing mold was controlled to 60°±1° C. The starting materials were injected into the testing mold, and the weight of the molded polyurethane foam was divided by its volume of 300 cm³.
[Hardness]

Hardness was determined by an Asker C hardness tester.
[Initial Tensile Strength and Initial Elongation]

The starting materials were injected into the above-mentioned mold at 60 °±1° C. After 3.5 minutes passed from the injection, a molded product was demolded. A prescribed dumbbell-like sample was punched out from the molded product. After 5 minutes passed from the injection of the starting materials, initial tensile strength and initial elongation were determined by the method prescribed in JIS K-6301.

[Tensile Strength and Elongation]

Tensile strength and elongation were determined by the method prescribed in JIS K-6301.
B. Moldability
[Air-Lack and Void]

A testing mold (provided with a wavy design with a depth of about 3 mm on its side face, and an internal shape corresponding to the shape of a midsole of a length of 300 mm, a maximum width of 100 mm, a minimum width of 60 mm and a height of a heel portion of 40 mm, material: iron) was used. A mold releasing agent commercially available from Kao Corporation under the trade name of "PURAPOWER 2060" was sprayed on the internal face of the mold, and wiped off with a waste cloth. Thereafter, the mold temperature was controlled to 60°±2° C. The starting materials were injected straightforwardly from the heel to the tiptoe, and the molded articles were demolded after 5 minutes passed, to give a molded article of a polyurethane foam. Ten molded articles were produced, and whether or not there was any air-lack in the side face design of the molded article or any void in the internal of the molded article was observed. Its average was evaluated on the basis of the following evaluation criteria:

(Evaluation Criteria)

○: Number of samples in which air-lack or void was generated being not more than 2

Δ: Number of samples in which air-lack or void was generated being 3 to 5 (no problem for practical uses)

x: Number of samples in which air-lack or void was generated being 6 to 10
[Demoldability]

A testing mold (mold having an internal shape corresponding to the shape of a midsole of a length of 280 mm, maximum width of 100 mm, a minimum width of 70 mm and a height of a heel portion of 35 mm, material: aluminum) was heated to 60° C. Thereafter, the starting materials were injected into the testing mold so th at the molded article has a given density (0.25 g/cm³), and the mold was sealed. After 5 minutes passed, the mold was opened, and the resulting molded article was demolded. During demolding, one end of the molded article in the longitudinal direction was held by fingers, and pulled out at once.

The external appearance of the side face in the longitudinal direction at the upper part and the arch of the foot of the resulting molded article was observed, and evaluated in accordance with the following evaluation criteria:

(Evaluation Criteria)

○: No abnormality being observed in the external appearance

Δ: Slight cracks being observed, but has no problem for practical uses x: Obvious tear being observed

TABLE 1

| Ex. No. | 1 | 2 | 3 | 4 | 5 | 6 | 7 |
|---|---|---|---|---|---|---|---|
| Polyol Solution (parts by weight) Polyester-Polyol | | | | | | | |
| EDDYFOAM E-601 | 45 | 45 | 45 | 90 | 45 | 45 | 70 |
| EDDYFOAM E-605 | 45 | 45 | 45 | 0 | 45 | 45 | 0 |
| EDDYFOAM E-540 | 10 | 10 | 10 | 10 | 0 | 0 | 0 |
| Polyester-Polyol A | 0 | 0 | 0 | 0 | 10 | 0 | 0 |
| Polyester-Polyol B | 0 | 0 | 0 | 0 | 0 | 10 | 30 |
| Ethylene Glycol | 10.0 | 10.5 | 10.5 | 10.5 | 10.5 | 10.5 | 9.5 |

TABLE 1-continued

| | | | | | | | |
|---|---|---|---|---|---|---|---|
| Catalyst | 1.20 | 1.15 | 1.25 | 1.15 | 1.15 | 1.15 | 1.15 |
| Water | 1.3 | 1.3 | 1.3 | 1.3 | 1.3 | 1.3 | 1.3 |
| Pigment | 2.0 | 2.0 | 2.0 | 2 | 2.0 | 2.0 | 2.0 |
| Surfactant | 1.0 | 1.0 | 1.0 | 1 | 1.0 | 1.0 | 1.0 |
| Urea | 0.5 | 1.0 | 1.0 | 1 | 1.0 | 1.0 | 1.0 |
| Polyisocyanate Compound | 125 | 128 | 128 | 133 | 128 | 129 | 124 |
| Isocyanate Index | 102 | 104 | 104 | 104 | 104 | 104 | 104 |
| Physical Properties of Foam | | | | | | | |
| Density of Formed Article (g/cm$^3$) | 0.25 | 0.25 | 0.25 | 0.25 | 0.25 | 0.25 | 0.25 |
| Hardness (Asker C) | 57 | 57 | 57 | 57 | 58 | 58 | 58 |
| Initial Tensile Strength (MPa) | 0.74 | 0.83 | 1.17 | 1.00 | 0.92 | 0.90 | 1.00 |
| Initial Elongation (%) | 260 | 280 | 320 | 290 | 270 | 270 | 260 |
| Tensile Strength (MPa) | 2.45 | 2.65 | 2.91 | 2.70 | 2.79 | 2.76 | 2.80 |
| Elongation (%) | 340 | 350 | 350 | 350 | 340 | 340 | 320 |
| Moldability | | | | | | | |
| Air-Lack | Δ | ○ | Δ | ○ | ○ | ○ | ○ |
| Void | ○ | ○ | ○ | ○ | ○ | ○ | ○ |
| Demoldability (5 minutes) | ○ | ○ | ○ | ○ | ○ | ○ | ○ |

| Ex. No. | 8 | 9 | Comp. Ex. 1 | Comp. Ex. 2 | Comp. Ex. 3 | Comp. Ex. 4 | Comp. Ex. 5 |
|---|---|---|---|---|---|---|---|
| Polyol Solution (parts by weight) Polyester-Polyol | | | | | | | |
| EDDYFOAM E-601 | 90 | 45 | 45 | 45 | 45 | 45 | 45 |
| EDDYFOAM E-605 | 0 | 45 | 45 | 45 | 45 | 45 | 45 |
| EDDYFOAM E-540 | 5 | 10 | 10 | 10 | 10 | 10 | 10 |
| Polyester-Polyol A | 0 | 0 | 0 | 0 | 0 | 0 | 0 |
| Polyester-Polyol B | 5 | 0 | 0 | 0 | 0 | 0 | 0 |
| Ethylene Glycol | 11 | 11.0 | 9.0 | 9.0 | 13.0 | 10.5 | 10.5 |
| Catalyst | 1.20 | 1.15 | 1.30 | 1.15 | 0.75 | 1.15 | 1.15 |
| Water | 1.3 | 1.3 | 1.3 | 1.3 | 1.3 | 2.0 | 0 |
| Pigment | 2 | 2.0 | 2.0 | 2.0 | 2.0 | 2.0 | 2.0 |
| Surfactant | 1 | 1.0 | 1.0 | 1.0 | 1.0 | 1.0 | 1.0 |
| Urea | 1 | 2.0 | 0 | 0 | 5.5 | 1.0 | 1.0 |
| Polyisocyanate Compound | 137 | 133 | 114 | 114 | 147 | 144 | 99 |
| Isocyanate Index | 104 | 105 | 100 | 100 | 108 | 108 | 108 |
| Physical Properties of Foam | | | | | | | |
| Density of Formed Article (g/cm$^3$) | 0.25 | 0.25 | 0.25 | 0.25 | 0.25 | — | — |
| Hardness (Asker C) | 59 | 58 | 58 | 57 | 60 | — | — |
| Initial Tensile Strength (MPa) | 1.10 | 1.05 | 0.67 | 0.44 | 0.30 | — | — |
| Initial Elongation (%) | 310 | 300 | 280 | 200 | 150 | — | — |
| Tensile Strength (MPa) | 2.88 | 2.82 | 2.35 | 2.30 | 2.20 | — | — |
| Elongation (%) | 320 | 350 | 330 | 330 | 220 | — | — |
| Moldability | | | | | | | |
| Air-Lack | ○ | ○ | x | ○ | ○ | — | — |
| Void | ○ | ○ | Δ | ○ | ○ | — | — |
| Demoldability (5 minutes) | ○ | ○ | Δ | x | x | — | — |

It can be seen from the results shown in Table 1 that the polyurethane foams obtained in Examples 1 to 9 are more excellent in moldability and higher in initial tensile strength, and the demolding time can be more shortened, as compared to the polyurethane foam obtained in Comparative Example 1. Accordingly, these examples are excellent in productivity and remarkably improve tensile strength.

In Example 3, demolding could be carried out after 3.5 minutes passed from the injection of the starting materials.

Comparative Example 2 is the case where the amount of the catalyst is reduced in order to improve moldability. However, it can be seen that demolding cannot be carried out within a given period of time, since the initial tensile strength is not sufficiently exhibited due to no addition of urea in this example.

In addition, according to Comparative Example 3, since urea is added in an amount exceeding the necessary amount, the urea acts as a foreign matter. As a result, it can be seen that the strength of a molded article is lowered.

According to Comparative Example 4, since water is added in an amount exceeding the necessary amount, skin peeling was generated, so that the physical properties of the foam could not be examined. Also, according to Comparative Example 5, since water was not used at all, the foam remarkably shrank, so that the physical properties of the foam could not be examined.

INDUSTRIAL APPLICABILITY

According to the present invention, there can be provided a process for producing a polyurethane foam which satisfies both productivity and moldability even when having a low density.

What is claimed is:

1. A process for producing a polyurethane foam comprising mixing a polyol solution comprising a polyester-polyol, 0.1 to 1.8 parts by weight of water and 0.1 to 5 parts by weight of urea based on 100 parts by weight of the polyester-polyol, and a catalyst, with a polyisocyanate compound and foaming the mixture.

2. A process for producing a polyurethane foam comprising mixing a polyol solution comprising a polyester-polyol, 0.1 to 1.8 parts by weight of water and 0.1 to 5 parts by weight of urea based on 100 parts by weight of the polyester-polyol, and a catalyst, with a polyisocyanate compound and foaming the mixture, wherein the density of the polyurethane foam is 0.15 to 0.45 g/cm$^3$.

3. The process for producing a polyurethane foam according to claim 1 or 2, wherein the polyester-polyol is prepared by polycondensing:
   (a) an acid component comprising at least one phthalic acid component selected from phthalic anhydride, o-phthalic acid and terephtalic acid, and an aliphatic polybasic acid; with
   (b) a polyhydric alcohol, and
the polyester-polyol contains not less than 5% by weight of a polyester-polyol X which is liquid at 40° C. and has a viscosity of not more than 10,000 mPa·s at 60° C.

4. The process for producing a polyurethane foam according to claim 3, wherein the content of the polyester-polyol X in the polyester-polyol is 5 to 95% by weight.

5. The process for producing a polyurethane foam according to claim 1 or 2, wherein the polyester-polyol comprises a dibasic acid and a polyhydric alcohol comprising a trifunctional component.

6. The process for producing a polyurethane foam according to claim 5, wherein the molar ratio of the trifunctional component/polyhydric alcohol is 0.01 to 0.3.

7. The process for producing a polyurethane foam according to claim 5, wherein the amount of the trifunctional component is 0.1 to 20 parts by weight based on 100 parts by weight of the polyester-polyol.

8. The process for producing a polyurethane foam according to claim 1 or 2, wherein the amount of water is 0.8 to 1.6 parts by weight based on 100 parts by weight of the polyester-polyol.

9. The process for producing a polyurethane foam according to claim 1 or 2, wherein the amount of urea is 0.5 to 2 parts by weight based on 100 parts by weight of the polyester-polyol.

* * * * *